(12) United States Patent
Konno et al.

(10) Patent No.: US 7,606,023 B2
(45) Date of Patent: Oct. 20, 2009

(54) ELECTRONIC APPARATUS

(75) Inventors: Toshio Konno, Akiruno (JP); Masanori Sato, Koganei (JP); Tomomi Murayama, Nishitama-gun (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 239 days.

(21) Appl. No.: 11/789,923

(22) Filed: Apr. 25, 2007

(65) Prior Publication Data

US 2007/0285878 A1 Dec. 13, 2007

(30) Foreign Application Priority Data

Jun. 8, 2006 (JP) ............................. 2006-160041

(51) Int. Cl.
G06F 1/16 (2006.01)
(52) U.S. Cl. ............................. 361/679.26; 361/679.02
(58) Field of Classification Search ................. 361/681, 361/683
See application file for complete search history.

(56) References Cited

U.S. PATENT DOCUMENTS

| | | |
|---|---|---|
| 5,168,429 A | 12/1992 | Hosoi |
| 5,255,214 A | 10/1993 | Ma |
| 5,379,182 A | 1/1995 | Fujimori et al. |
| 5,568,357 A | 10/1996 | Kochis et al. |
| 5,623,392 A | 4/1997 | Ma |
| 5,699,131 A | 12/1997 | Aoki |
| 5,703,665 A | 12/1997 | Muramatsu et al. |
| 5,844,774 A | 12/1998 | Gushiken |
| 6,212,067 B1 | 4/2001 | Nakajima et al. |
| 6,411,501 B1 * | 6/2002 | Cho et al. .................... 361/681 |
| 6,421,231 B1 * | 7/2002 | Jung .......................... 361/681 |
| 6,430,039 B2 | 8/2002 | Nakajima et al. |
| 6,525,790 B1 * | 2/2003 | Kan-o ......................... 349/58 |
| 6,593,979 B1 | 7/2003 | Ha et al. |
| 6,989,986 B2 * | 1/2006 | Kumagai et al. ............. 361/681 |
| 7,400,497 B2 * | 7/2008 | Zhang et al. ................. 361/683 |
| 2002/0149714 A1 | 10/2002 | Anderson et al. |
| 2003/0128307 A1 | 7/2003 | Ito et al. |
| 2004/0182979 A1 | 9/2004 | Krzoska et al. |
| 2005/0068470 A1 | 3/2005 | Won |
| 2005/0264712 A1 | 12/2005 | Kim et al. |
| 2006/0181843 A1 | 8/2006 | Takahashi |
| 2006/0256513 A1 * | 11/2006 | Yeh et al. ..................... 361/681 |

(Continued)

FOREIGN PATENT DOCUMENTS

CN 1497924 5/2004

(Continued)

*Primary Examiner*—Lisa Lea-Edmonds
(74) *Attorney, Agent, or Firm*—Blakely, Sokoloff, Taylor & Zafman LLP

(57) ABSTRACT

According to one embodiment, an electronic apparatus is provided with a first case including a peripheral wall, a display device contained in the first case and including four side faces, a second case, a hinge shaft which swingably supports the first case on the second case, and a bracket which is connected to the hinge shaft and extends in the first case. The bracket includes a holding portion, which extends along one of the side faces of the display device and is fixed to the display device, and a fixing portion fixed to a peripheral portion of the first case situated off regions defined between the four side faces of the display device and those wall portions of the peripheral wall which face the side faces, individually.

19 Claims, 12 Drawing Sheets

U.S. PATENT DOCUMENTS

2007/0053144 A1* 3/2007 Nakatani et al. ............ 361/680
2007/0165386 A1* 7/2007 Nakatani et al. ............ 361/752

FOREIGN PATENT DOCUMENTS

| | | |
|---|---|---|
| JP | 09/197383 | 7/1997 |
| JP | 10-039280 | 2/1998 |
| JP | 11-109878 | 4/1999 |
| JP | 2000-105628 | 1/2000 |

* cited by examiner

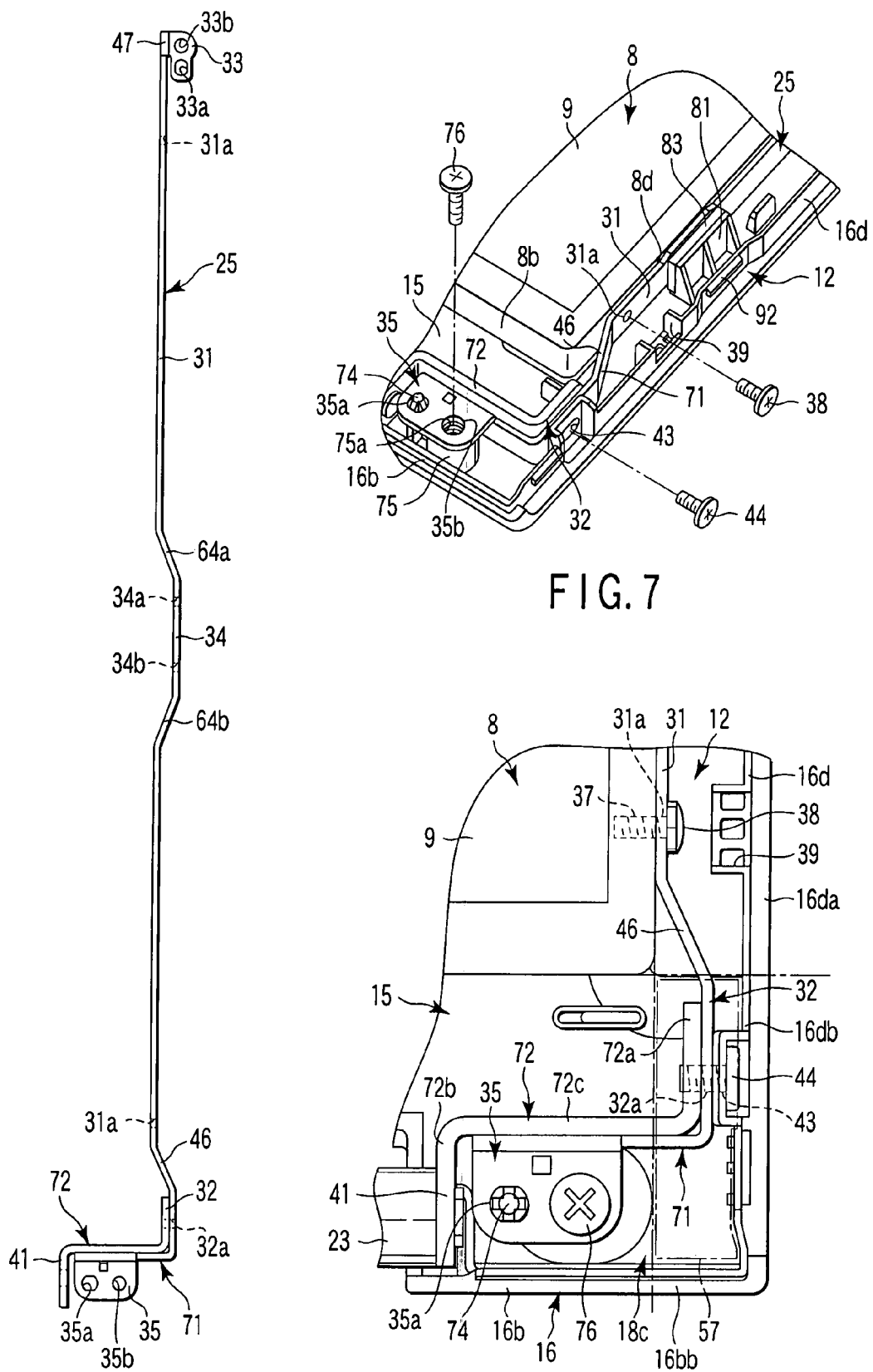

ELECTRONIC APPARATUS

CROSS-REFERENCE TO RELATED APPLICATIONS

This application is based upon and claims the benefit of priority from Japanese Patent Application No. 2006-160041, filed Jun. 8, 2006, the entire contents of which are incorporated herein by reference.

BACKGROUND

1. Field

One embodiment of the invention relates to an electronic apparatus including a display unit, for example, including a fixing structure for holding a display device contained in the display unit.

2. Description of the Related Art

An electronic apparatus, such as a portable computer, is provided with a display unit. The display unit has a housing, a display device contained in the housing, and brackets for fixing the display device to the housing.

Described in U.S. Pat. No. 6,992,884 B2 is an electronic apparatus that has a bracket for absorbing a dimensional difference between a housing and a display device. The bracket has a first portion fixed to the display device, a second portion fixed to the housing, and a junction that joins the first portion to the second portion.

If the electronic apparatus has a hinge mechanism that supports the display device, a hinge bracket that is coupled to the hinge mechanism is fixed to the housing independently of the aforesaid bracket.

Described in U.S. Pat. No. 6,430,039 B2 is an information apparatus in which a bracket that is coupled to a hinge mechanism is reinforced by an LCD supporting member. The LCD supporting member is fixed to an LCD and a housing. Further, the LCD supporting member is connected to an end portion of the hinge bracket.

The second portion (i.e., the portion fixed to the housing) of the bracket of the electronic apparatus described above has mounting holes immediately beside the display device. The bracket is fixed to the housing in a manner such that screws inserted in the mounting holes of the bracket are engaged individually with threaded holes in the housing. If the electronic apparatus is dropped on the floor or a desk so that the display device is subjected to a load in the direction of a lateral deviation, for example, an impact load inevitably acts between the display device and the screws, thereby possibly breaking the display device.

The LCD supporting member of the information apparatus also has mounting holes just beside the display device into which mounting screws are inserted. Also if this information apparatus is dropped, an impact load acts between the LCD and the screws, so that the LCD may be broken in some cases.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 6 is an exemplary plan view of the bracket according to the first embodiment;

FIG. 7 is an exemplary perspective view showing an inside portion of the display unit enclosed by a dash-dotted line A of FIG. 5;

FIG. 8 is an exemplary plan view showing the inside portion of the display unit enclosed by the dash-dotted line A of FIG. 5;

DETAILED DESCRIPTION

Various embodiments according to the invention will be described hereinafter with reference to the accompanying drawings. In general, according to one embodiment of the invention, an electronic apparatus is provided with a first case including a peripheral wall, a display device contained in the first case and including four side faces, a second case, a hinge shaft which swingably supports the first case on the second case, and a bracket which is connected to the hinge shaft and extends in the first case. The bracket includes a holding portion, which extends along one of the side faces of the display device and is fixed to the display device, and a fixing portion fixed to a peripheral portion of the first case situated off regions defined between the four side faces of the display device and those wall portions of the peripheral wall which face the side faces, individually.

Embodiments of the present invention applied to portable computers will now be described with reference to the accompanying drawings.

Figure 1:
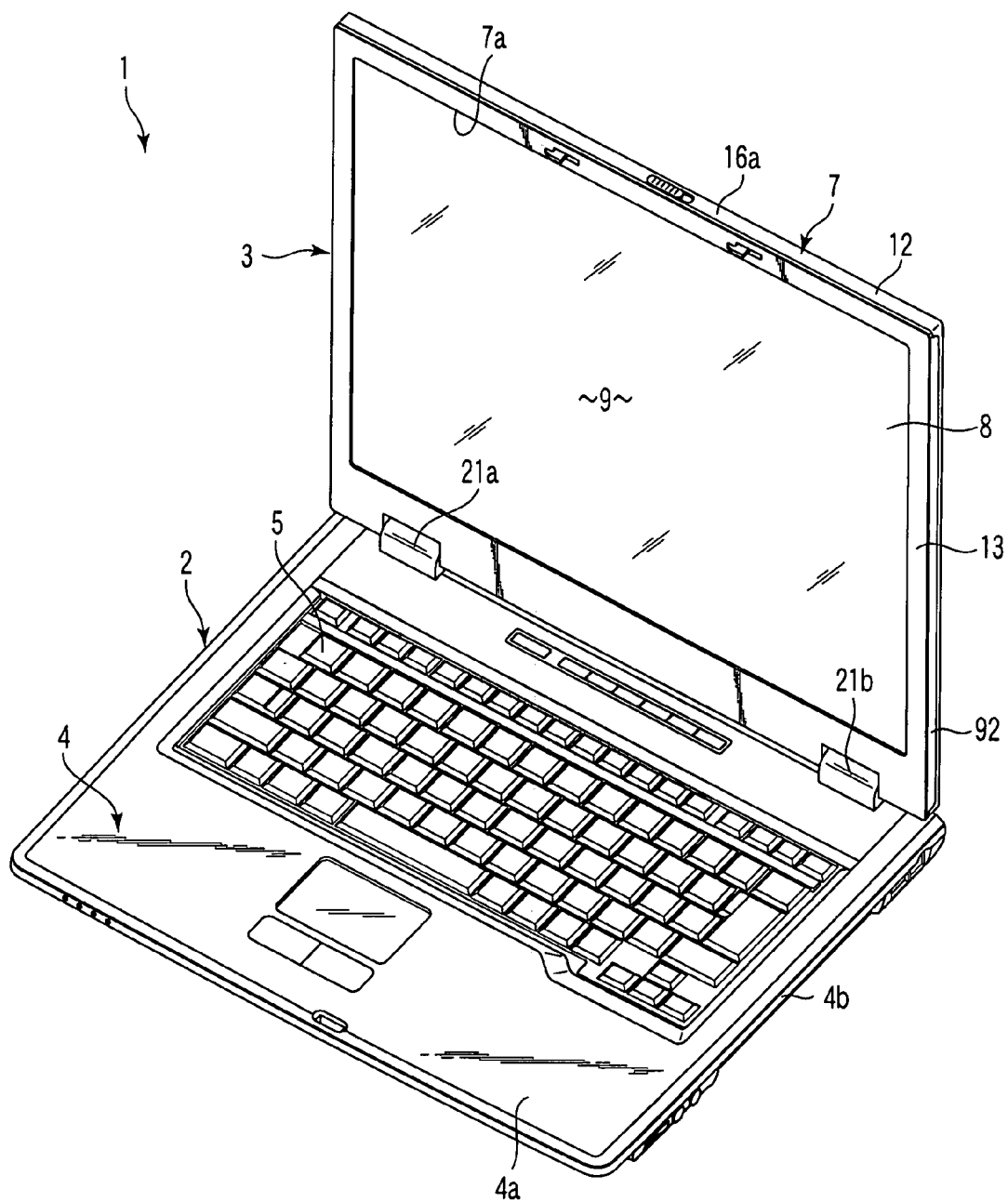
FIG. 1 is an exemplary perspective view of a portable computer according to a first embodiment of the invention.

FIGS. 1 to 17 show a portable computer 1 as an electronic apparatus according to a first embodiment of the invention. As shown in FIG. 1, the portable computer 1 is provided with a body 2 and a display unit 3.

The body 2 includes a body case 4. The body case 4 is an example of a second case according to the invention. It is in the form of a box having a top wall 4a, a peripheral wall 4b, and a bottom wall (not shown). The body 2 has a circuit board and a plurality of electronic components mounted in the body case 4. The top wall 4a of the case 4 supports a keyboard 5.

As shown in FIG. 1, the display unit 3 has a display housing 7 and a display device 8 in the housing 7. The housing 7 is an example of a first case. It has a window 7a.

An example of the display device 8 is a liquid crystal display, plasma display, organic electroluminescent display, or surface-field display. The display device 8 has a display screen 9. The screen 9 is exposed to the outside of the display housing 7 through the window 7a.

Figure 2:
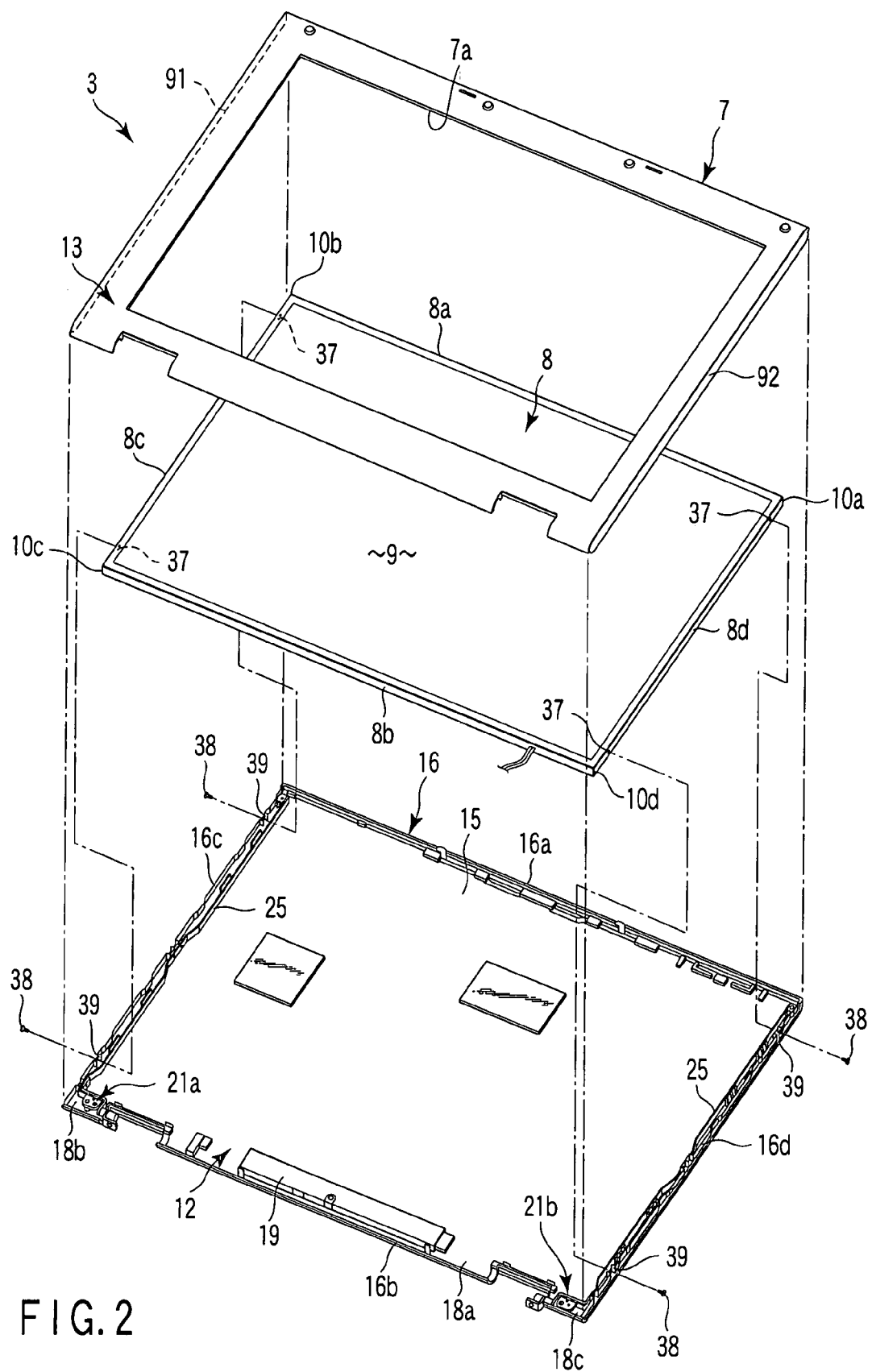
FIG. 2 is an exemplary exploded perspective view showing a display unit according to the first embodiment.
Figure 4:
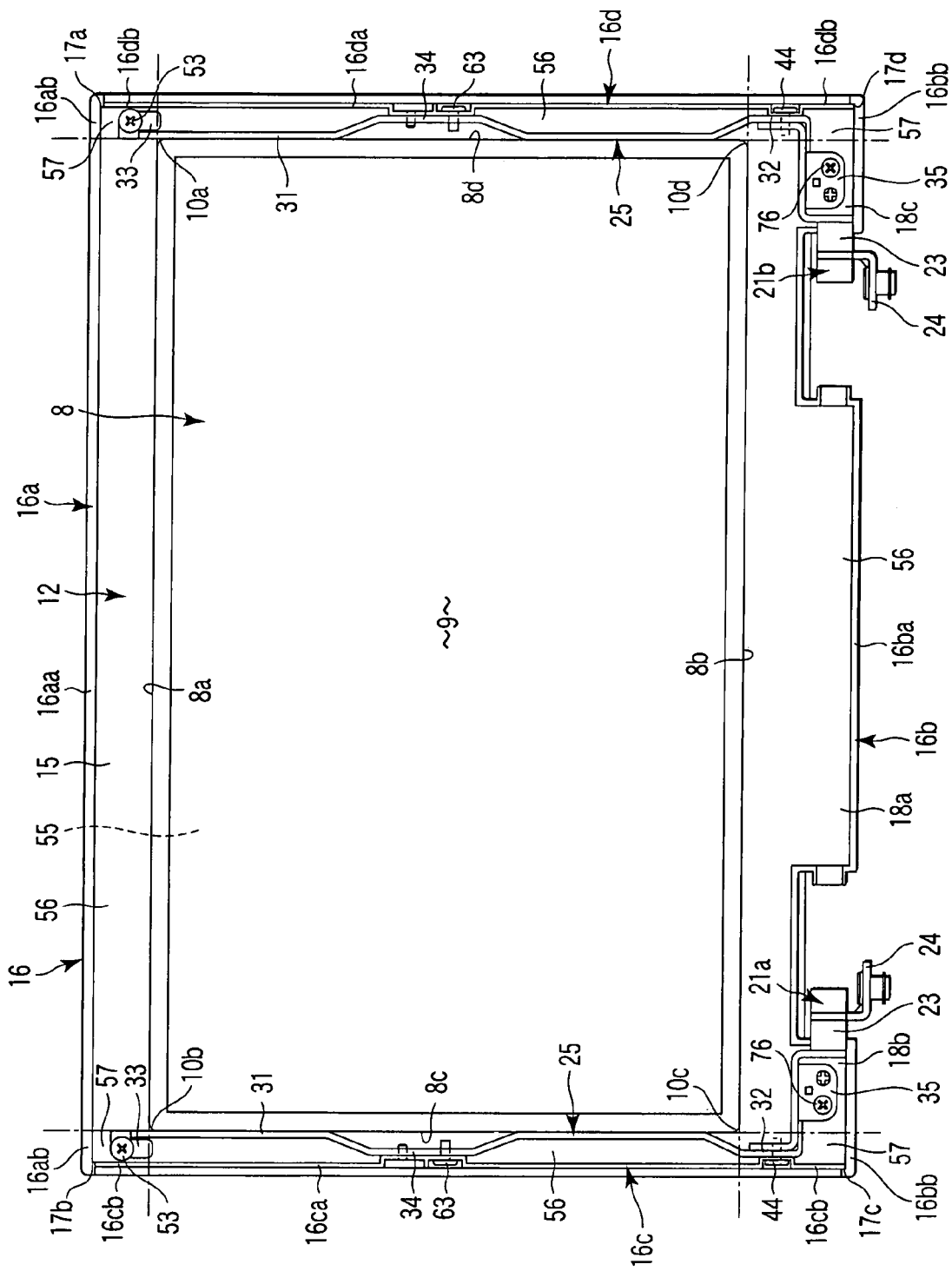
FIG. 4 is an exemplary plan view typically showing the interior of the display unit according to the first embodiment.

As shown in FIGS. 2 and 4, the display device 8 is in the form of a rectangular plate, which has first, second, third, and fourth side faces 8a, 8b, 8c and 8d. The first side face 8a extends in the longitudinal direction of the portable computer 1 and forms an upper edge of the display device 8 in a state the display screen 9 faces a user. The second side face 8b extends parallel to the first side face 8a and forms a lower edge of the display device 8. The third and fourth side faces 8c and 8d individually extend at right angles to the first side face 8a and form left- and right-hand edges, respectively, of the display device 8.

As shown in FIG. 4, the display device 8 has first, second, third, and fourth corner portions 10a, 10b, 10c and 10d that are defined by the first to fourth side faces 8a to 8d.

As shown in FIG. 2, the display housing 7 has a cover 12 and a mask 13. When the mask 13 and the cover 12 are combined together, they form the box-shaped display housing 7 in cooperation with each other.

FIG. 4 is a view typically showing the relationship between the cover 12 and the display device 8. The cover 12 has a rear wall 15 and a peripheral wall 16. The rear wall 15 is situated behind the display device 8 so as to face the back (i.e., surface opposite from the display screen 9) of the display device 8. The rear wall 15 is larger than the contour of the display device 8.

The peripheral wall 16 rises from the peripheral edge portions of the rear wall 15 and surrounds the side faces 8a to 8d of the display device 8. More specifically, the peripheral wall 16 includes an upper peripheral wall 16a, lower peripheral wall 16b, left-hand peripheral wall 16c, and right-hand peripheral wall 16d. The upper and lower peripheral walls 16a and 16b extend parallel to each other in the longitudinal direction of the portable computer 1. The left- and right-hand peripheral walls 16c and 16d extend at right angles to the upper peripheral wall 16a. They are situated in positions slightly inside the edges of the rear wall 15 in the cover 12. As shown in FIG. 4, the cover 12 has first, second, third, and fourth corner portions 17a, 17b, 17c and 17d that are defined by the peripheral walls 16a, 16b, 16c and 16d.

The upper peripheral wall 16a of the cover 12 has a first wall portion 16aa and second wall portions 16ab. The first wall portion 16aa is formed on the central part of the upper peripheral wall 16a and faces the first side face 8a of the display device 8. The second wall portions 16ab are formed individually on the left- and right-hand end portions of the upper peripheral wall 16a and don't face the display device 8. The lower peripheral wall 16b of the cover 12 has a first wall portion 16ba and second wall portions 16bb. The first wall portion 16ba is formed on the central part of the lower peripheral wall 16b and faces the second side face 8b of the display device 8. The second wall portions 16bb are formed individually on the left- and right-hand end portions of the lower peripheral wall 16b and don't face the display device 8.

The left-hand peripheral wall 16c of the cover 12 has a first wall portion 16ca and second wall portions 16cb. The first wall portion 16ca is formed on the central part of the left-hand peripheral wall 16c and faces the third side face 8c of the display device 8. The second wall portions 16cb are formed individually on the upper and lower end portions of the left-hand peripheral wall 16c and don't face the display device 8.

The right-hand peripheral wall 16d of the cover 12 has a first wall portion 16da and second wall portions 16db. The first wall portion 16da is formed on the central part of the right-hand peripheral wall 16d and faces the fourth side face 8d of the display device 8. The second wall portions 16db are formed individually on the upper and lower end portions of the right-hand peripheral wall 16d and don't face the display device 8.

First, second, and third projections 18a, 18b and 18c are provided at the lower end portion of the cover 12. The first projection 18a projects from the central part of the lower end portion of the cover 12 to the outside of the cover 12. An inverter 19 as an example of an electronic component is housed in the first projection 18a. The second and third projections 18b and 18c project individually from the left- and right-hand end portions of the cover 12 to the outside of the cover.

Figure 3:
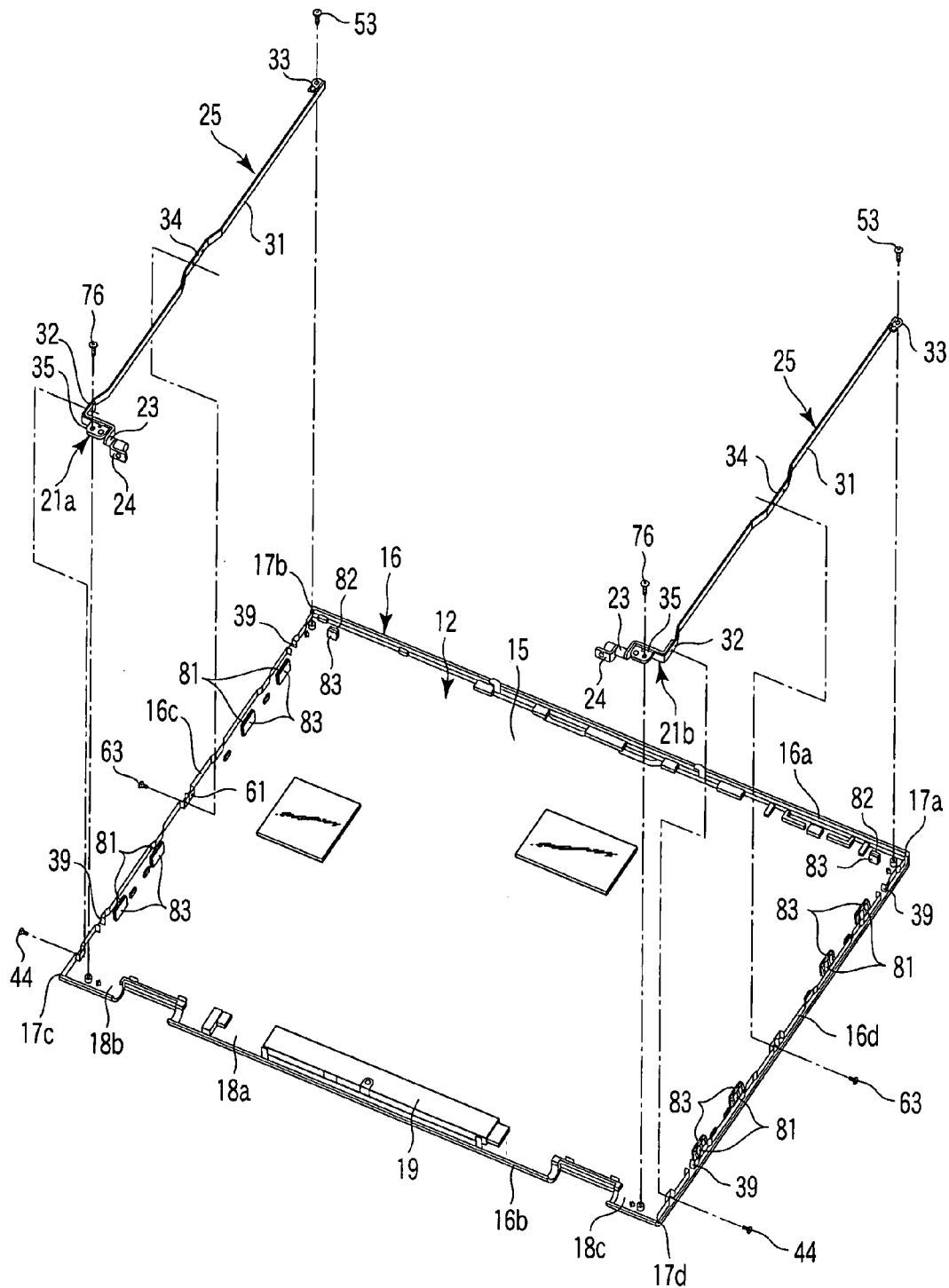
FIG. 3 is an exemplary perspective view showing a cover and brackets according to the first embodiment.

As shown in FIG. 1, the portable computer 1 is provided with a pair of hinge mechanisms 21a and 21b, which connect the display housing 7 to the body case 4 for rocking motion. As shown in FIG. 3, each of the hinge mechanisms 21a and 21b has a hinge shaft 23, a first bracket 24, and a second bracket 25. Since the two hinge mechanisms 21a and 21b have the same construction but in symmetric relation, the hinge portion 21b at the right-hand end portion of the computer 1 will be representatively described in detail herein. Like reference numbers are used to designate like portions of the other hinge mechanism 21a, and a description of those portions will be omitted.

Figure 5:
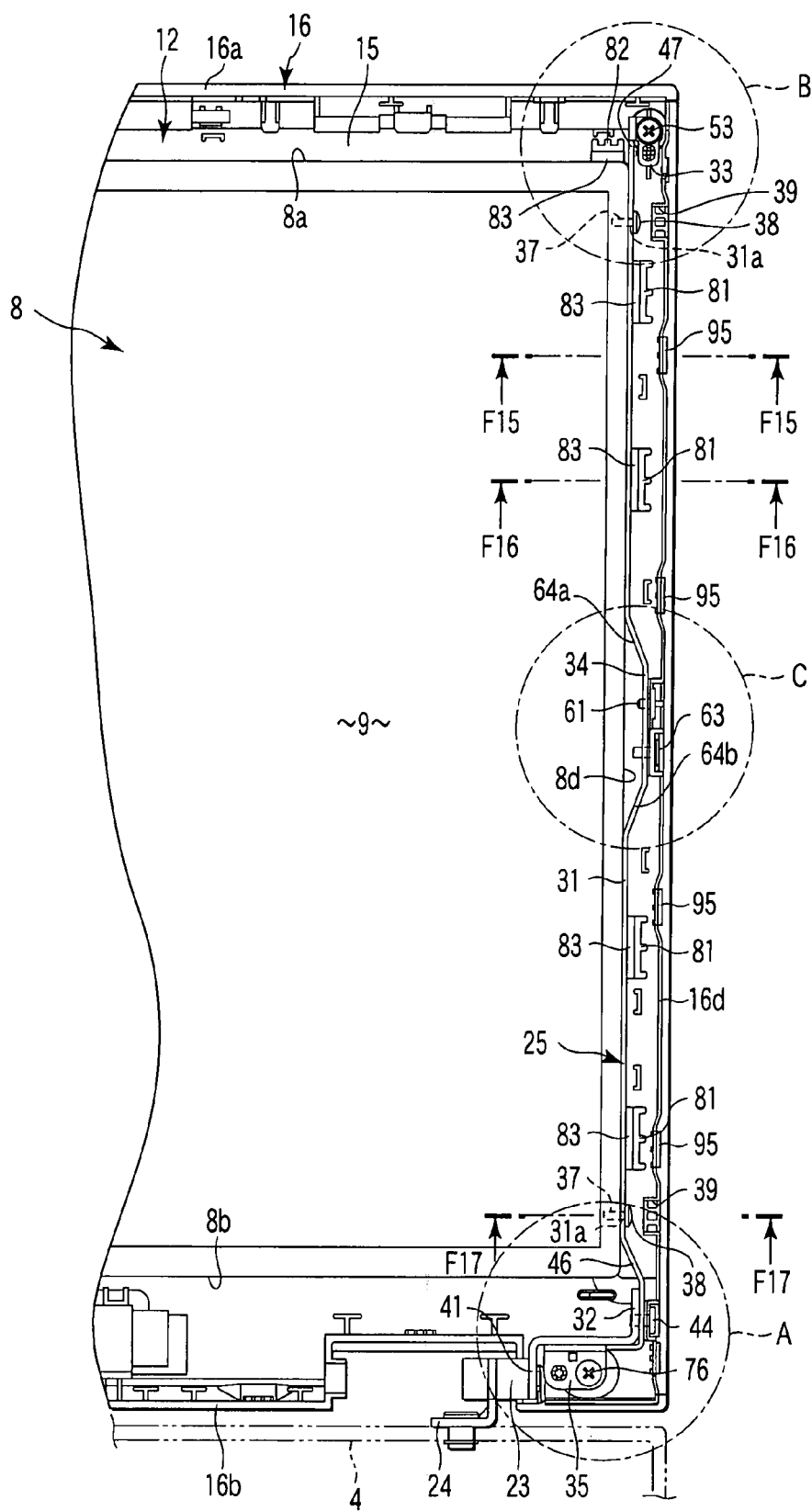
FIG. 5 is an exemplary plan view showing a right-hand end portion of the interior of the display unit according to the first embodiment.

As shown in FIG. 5, the hinge shaft 23 is provided between the display housing 7 and the body case 4. One end portion of the first bracket 24 is connected to the hinge shaft 23, and the other end portion thereof is fixed to the body case 4. One end portion of the second bracket 25 is connected to the hinge shaft 23, and the other end portion thereof extends into the display housing 7 and is fixed to it.

The first and second brackets 24 and 25 are swingable around the hinge shaft 23 with respect to each other. With the aid of the brackets 24 and 25, the hinge shaft 23 swingably supports the display housing 7 on the body case 4.

The second bracket 25 (hereinafter referred to simply as the bracket 25) will now be described in detail with reference to FIGS. 5 to 12. The bracket 25 included in the other hinge mechanism 21a has the same construction except for the symmetry.

The bracket 25 extends at right angles to the axial direction of the hinge shaft 23 in the display housing 7. An example of the bracket 25 is formed of a metal plate and has elasticity. The bracket 25 has a holding portion 31 to be fixed to the display device 8 and first, second, third, and fourth fixing portions 32, 33, 34 and 35 to be fixed to the display housing 7.

As shown in FIG. 5, the holding portion 31 of the bracket 25 extends along the fourth side face 8d of the display device 8. The holding portion 31 faces the fourth side face 8d so as to substantially cover the whole area thereof. The fourth side face 8d has threaded holes 37 in its opposite end portions, individually. The holding portion 31 of the bracket 25 has holes 31*a* in regions that face the threaded holes 37, individually.

Figure 9:
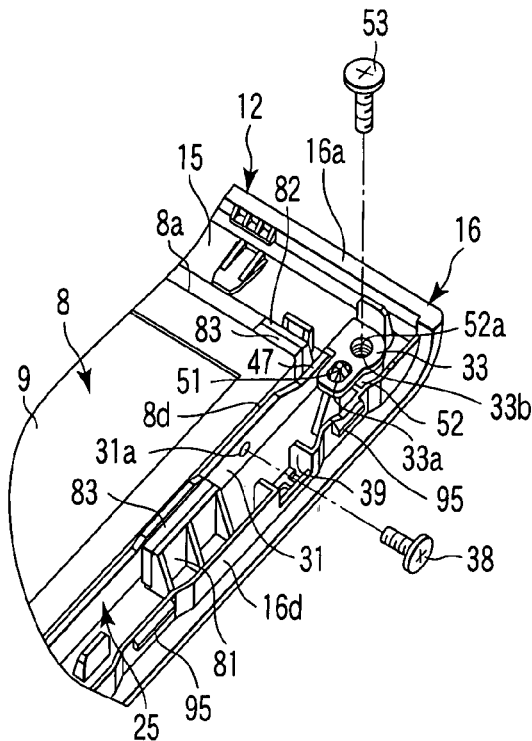
FIG. 9 is an exemplary perspective view showing an inside portion of the display unit enclosed by a dash-dotted line B of FIG. 5.

The bracket 25 is fixed to the display device 8 by screws 38. More specifically, the screws 38 are inserted individually into the holes 31*a* of the bracket 25 and engaged with the threaded holes 37 of the display device 8, whereby the bracket 25 is fixed to the display device 8. As shown in FIGS. 7 and 9, the screws 38 are attached to the holes 31*a* and the threaded holes 37 along a direction perpendicular to the fourth side face 8*d* of the display device 8. Thus, the screws 38 are laterally attached to the display device 8.

As shown in FIGS. 7 and 9, the right-hand peripheral wall 16*d* of the cover 12 has notches 39 in regions that face the holes 31*a* of the bracket 25. The notches 39 are larger than the screws 38. The screws 38 are inserted into the holes 31*a* of the bracket 25 through the notches 39, individually, from outside the cover 12.

As shown in FIGS. 7 and 8, the first fixing portion 32 of the bracket 25 is provided between the holding portion 31 and an end portion 41 that is connected to the hinge shaft 23. More specifically, the first fixing portion 32 is provided extending along the second wall portions 16*db* of the right-hand peripheral wall 16*d* of the cover 12 and faces the wall 16*d*. The first fixing portion 32 has a threaded hole 32*a*.

The right-hand peripheral wall 16*d* of the cover 12 is formed having a hole 43 that faces the threaded hole 32*a* of the first fixing portion 32. When a screw 44 is inserted into the hole 43 and engaged with the threaded hole 32*a* of the bracket 25, the first fixing portion 32 is fixed to the cover 12. As shown in FIG. 7, the screw 44 is attached to the right-hand peripheral wall 16*d* at right angles to it, that is, sideways with respect to the cover 12.

As shown in FIG. 8, a first damper portion 46 is provided between the first fixing portion 32 and the holding portion 31. The first damper portion 46 extends at slanted angles to the fourth side face 8*d* of the display device 8 and is spaced from the display device 8.

As shown in FIG. 5, the second fixing portion 33 of the bracket 25 is fixed to that peripheral edge portion of the display housing 7 which is remotest from the hinge shaft 23. Specifically, the second fixing portion 33 is provided at that end portion of the bracket 25 opposite from the end portion 41 that is connected to the hinge shaft 23. A second damper portion 47 that extends spaced from the display device 8 is provided between the second fixing portion 33 and the holding portion 31.

Figure 10:
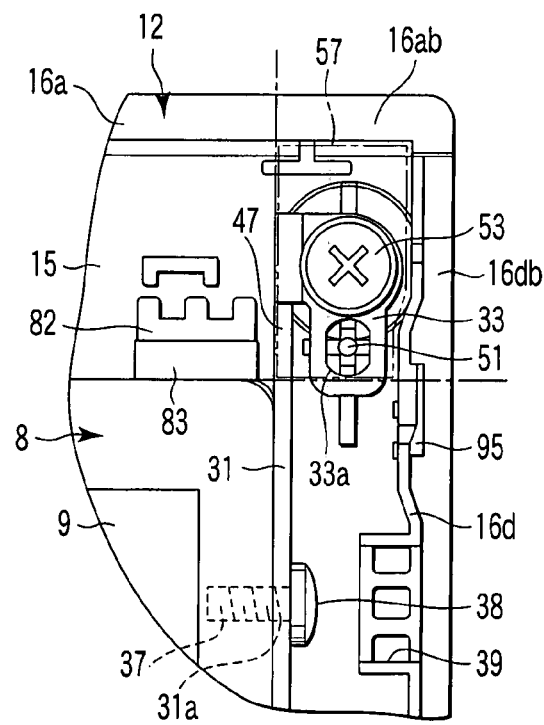
FIG. 10 is an exemplary plan view showing the inside portion of the display unit enclosed by the dash-dotted line B of FIG. 5.

As shown in FIGS. 9 and 10, the distal end portion of the bracket 25 is bent so that a part of it faces the rear wall 15 of the cover 12. The distal end portion of the bracket 25 is bent away from the display device 8. The second fixing portion 33 is provided at the bent distal end portion of the bracket 25. It has an engaging hole 33*a* and a hole 33*b*. An engaging protrusion 51 and a boss 52 that face the second fixing portion 33 rise from the rear wall 15 of the cover 12.

The engaging protrusion 51 faces the engaging hole 33*a* of the second fixing portion 33. A mounting position for the bracket 25 is adjusted, that is, the bracket 25 is positioned, by fitting the engaging protrusion 51 into the engaging hole 33*a*. The boss 52 is formed having a threaded hole 52*a* that faces the hole 33*b* of the second fixing portion 33. The second fixing portion 33 is fixed to the cover 12 by engaging a screw 53 with the threaded hole 52*a* through the hole 33*b*.

The following is a description of a region in the cover 12 to which the first and second fixing portions 32 and 33 of the bracket 25 are fixed. As shown in FIG. 4, the region in the cover 12 is divided into first, second, and third regions 55, 56 and 57. The first region 55 is situated behind the display device 8 so as to face its back. The second regions 56 are formed individually between the first wall portion 16*aa* of the upper peripheral wall 16*a* and the first side face 8*a* of the display device 8, between the first wall portion 16*ba* of the lower peripheral wall 16*b* and the second side face 8*b* of the display device 8, between the first wall portion 16*ca* of the left-hand peripheral wall 16*c* and the third side face 8*c* of the display device 8, and between the first wall portion 16*da* of the right-hand peripheral wall 16*d* and the fourth side face 8*d* of the display device 8.

The third regions 57 are formed in those peripheral edge portions of the display housing 7 which are situated off the first region 55 and the second regions 56. Specifically, each third region 57 is a region that is defined by each two adjacent ones of the second wall portions 16*ab*, 16*bb*, 16*cb* and 16*db* of the peripheral walls 16*a*, 16*b*, 16*c* and 16*d*. In other words, the third regions 57 are regions that are formed between the corner portions 10*a*, 10*b*, 10*c* and 10*d* of the display device 8 and the corner portions 17*a*, 17*b*, 17*c* and 17*d* of the cover 12. The third regions 57 include a part of the inner peripheral surface of each of the peripheral walls 16*a* to 16*d*, as well as a part of the rear wall 15 of the cover 12.

The first and second fixing portions 32 and 33 of the bracket 25 are both fixed to the third regions 57 of the cover 12. Specifically, the bracket 25 is fixed to that part of the cover 12 which outwardly extend beyond the contour of the display device 8.

Figure 11:
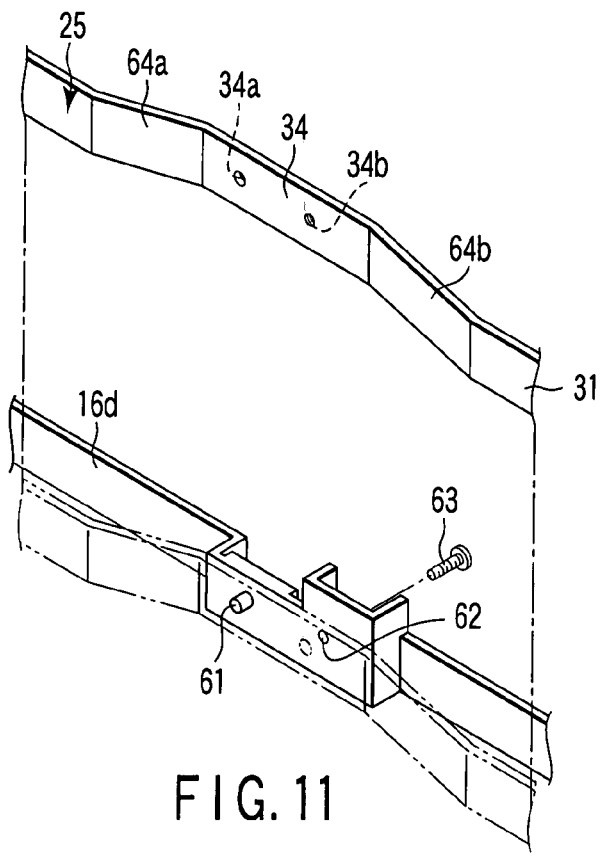
FIG. 11 is an exemplary perspective view showing an inside portion of the display unit enclosed by a dash-dotted line C of FIG. 5.
Figure 12:
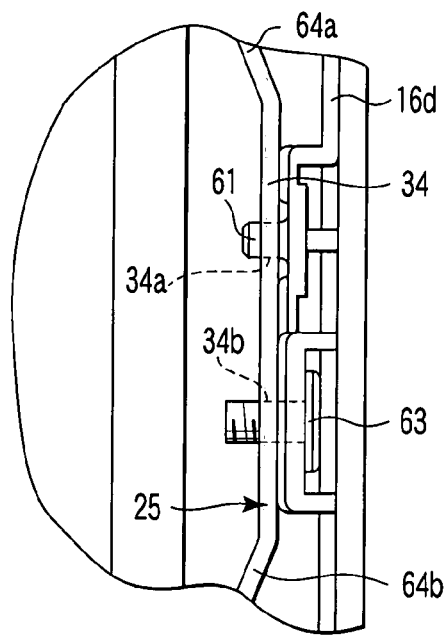
FIG. 12 is an exemplary plan view showing the inside portion of the display unit enclosed by the dash-dotted line C of FIG. 5.

As shown in FIG. 5, the bracket 25 has the third fixing portion 34 in the middle of the holding portion 31. The third fixing portion 34 is spaced from the display device 8 and extends along the right-hand peripheral wall 16*d* of the cover 12. As shown in FIGS. 11 and 12, it has an engaging hole 34*a* and a threaded hole 34*b*. The right-hand peripheral wall 16*d* of the cover 12 is formed having an engaging protrusion 61 and a hole 62 that face the third fixing portion 34. The engaging protrusion 61 faces the engaging hole 34*a*. The mounting position for the bracket 25 is adjusted, that is, the bracket 25 is positioned, by fitting the engaging protrusion 61 into the engaging hole 34*a*.

The hole 62 faces the threaded hole 34*b* of the third fixing portion 34. The third fixing portion 34 is fixed to the cover 12 by engaging a screw 63 with the threaded hole 34*b* through the hole 62.

A pair of third damper portions 64*a* and 64*b* are provided individually on the opposite end portions of the third fixing portion 34. They extend across the fourth side face 8*d* of the display device 8. The third damper portions 64*a* and 64*b* individually connect the third fixing portion 34 to that portions the holding portion 31 which extend along the display device 8.

As shown in FIG. 6, the bracket 25 includes a first member 71 and a second member 72, for example. The first member 71 constitutes a large part of the bracket 25 including the aforementioned holding portion 31. The second member 72 is provided at one end portion of the bracket 25. It is connected to the first member 71 by, for example, welding so that the two members are integral with each other.

As shown in FIG. 8, the second member 72 has first, second, and third portions 72*a*, 72*b* and 72*c*. The first portion 72*a* of the second member 72 extends along the right-hand peripheral wall 16*d* of the cover 12 and forms the first fixing portion 32 of the bracket 25 in cooperation with the first member 71. The second portion 72*b* of the second member 72 faces the hinge shaft 23 and is connected to the hinge shaft 23 for rocking motion, for example. The third portion 72*c* of the second member 72 extends between the first and second portions 72a and 72b so as to connect them.

An end portion of the first member 71 of the bracket 25 extends along the third portion 72c of the second member 72. The distal end portion of the first member 71 is bent so that a part of it faces the rear wall 15 of the cover 12. The fourth fixing portion 35 of the bracket 25 is provided at the bent distal end portion.

The fourth fixing portion 35 is located inside the third projection 18c of the cover 12. It has an engaging hole 35a and a hole 35b. An engaging protrusion 74 and a boss 75 rise from that region of the rear wall 15 of the cover 12 which faces the fourth fixing portion 35.

The engaging protrusion 74 faces the engaging hole 35a of the fourth fixing portion 35. The mounting position for the bracket 25 is adjusted, that is, the bracket 25 is positioned, by fitting the engaging protrusion 74 into the engaging hole 35a. The boss 75 is formed having a threaded hole 75a that faces the hole 35b. The fourth fixing portion 35 is fixed to the cover 12 by engaging a screw 76 with the threaded hole 75a of the boss 75 through the hole 35b of the bracket 25.

The first and second members 71 and 72 of the bracket 25 have thicknesses of, e.g., 1.0 mm and 1.5 mm, respectively. Thus, the thickness of the holding portion 31 of the bracket 25 is smaller than that of the end portion 41 that is connected to the hinge shaft 23, as shown in FIG. 6. Further, the thickness of that part of the bracket 25 between the first and second fixing portions 32 and 33 is smaller than the thickness of that part of the bracket 25 between the first fixing portion 32 and the end portion 41 that is connected to the hinge shaft 23.

Specifically, high mechanical strength is imparted to the region between the first fixing portion 32 and the end portion 41 that is connected to the hinge shaft 23 of the bracket 25. On the other hand, a high spring characteristic is imparted to the region between the first and second fixing portions 32 and 33 of the bracket 25.

As shown in FIGS. 3 and 5, first ribs 81 and second ribs 82 rise from the second regions 56 of the rear wall 15. The first ribs 81 are formed between the third and fourth side faces 8c and 8d of the display device 8 and the left- and right-hand peripheral walls 16c and 16d of the cover 12. The second ribs 82 are formed between the first side face 8a of the display device 8 and the upper peripheral wall 16a of the cover 12.

Figure 16:
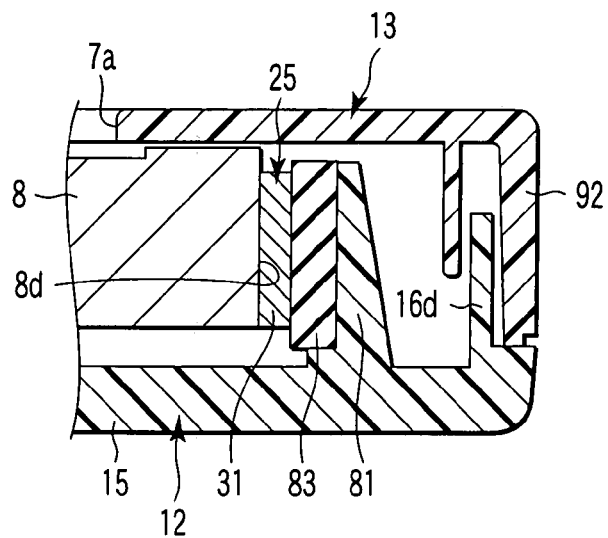
FIG. 16 is an exemplary sectional view of the display unit taken along line F16-F16 of FIG. 5.

The first and second ribs 81 and 82 face the side faces 8a, 8c and 8d of the display device 8. As shown in FIG. 16, damper members 83 are interposed between the first and second ribs 81 and 82 and the side faces 8a, 8c and 8d of the display device 8. The damper members 83, which are formed of synthetic rubber, for example, are attached to the ribs 81 and 82. They may be either in contact with the display device 8 or opposed to the display device 8 across a gap.

Figure 13:
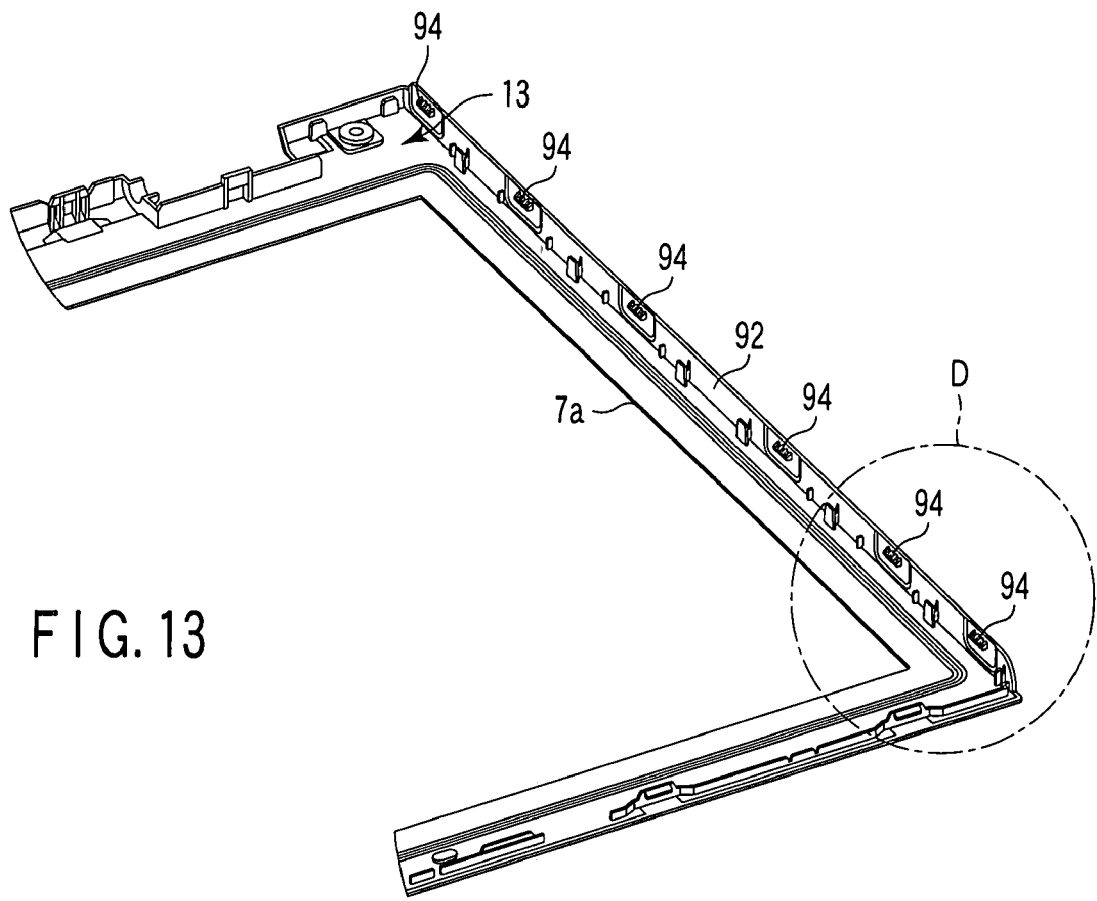
FIG. 13 is an exemplary perspective view of a mask according to the first embodiment.
Figure 15:
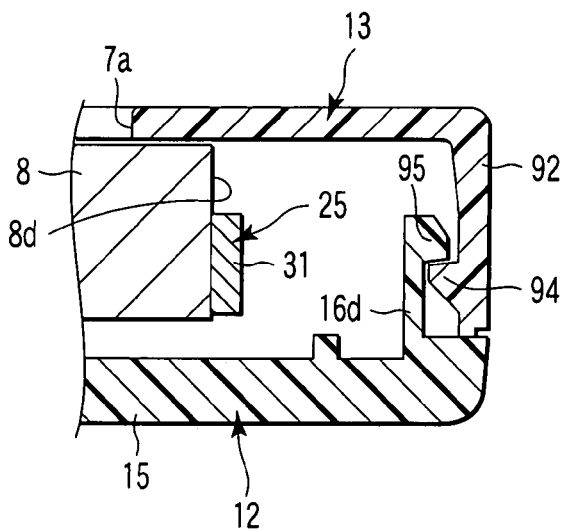
FIG. 15 is an exemplary sectional view of the display unit taken along line F15-F15 of FIG. 5.
Figure 17:
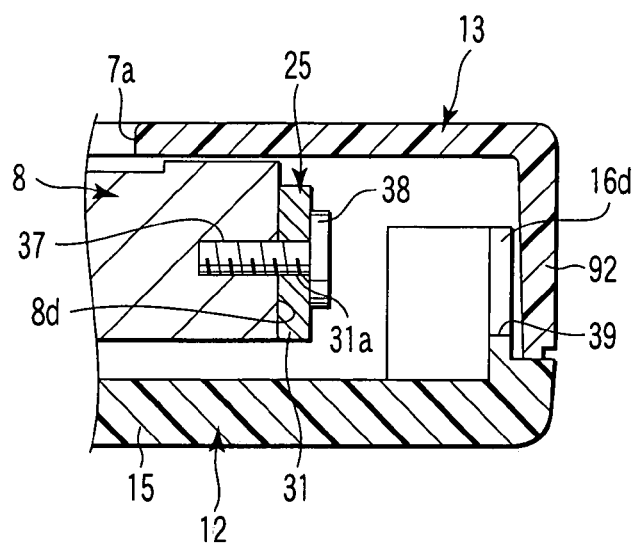
FIG. 17 is an exemplary sectional view of the display unit taken along line F17-F17 of FIG. 5.

As shown in FIG. 2, the mask 13 is combined with the cover 12. It faces the display screen 9 of the display device 8. The window portion 7a is formed in the mask 13. As shown in FIGS. 2 and 13, the mask 13 has left- and right-hand peripheral walls 91 and 92. As shown in FIGS. 15 to 17, the left- and right-hand peripheral walls 16c and 16d of the cover 12 rise from edge portions of the rear wall 15 so as to be situated inside the cover 12 by a margin equivalent to the thickness of the peripheral walls 91 and 92 of the mask 13.

When the mask 13 is assembled to the cover 12, the left- and right-hand peripheral walls 91 and 92 externally face the left- and right-hand peripheral walls 16c and 16d, respectively, of the cover 12. The peripheral walls 16c and 16d are covered by the peripheral walls 91 and 92, respectively. Thus, the notches 39 in the cover 12 are concealed by the peripheral walls 91 and 92 of the mask 13, as shown in FIG. 17. The peripheral walls 91 and 92 also conceal the screw 44 that is attached to the first fixing portion 32 of the bracket 25.

Figure 14:
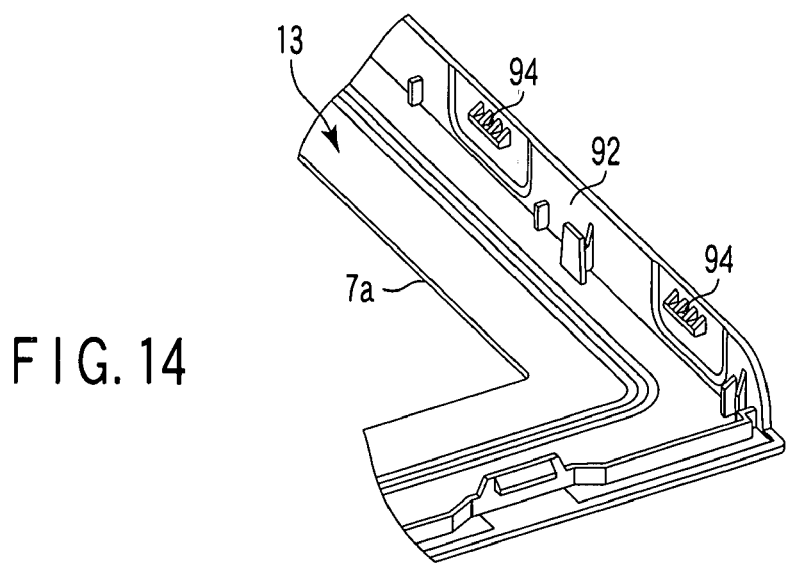
FIG. 14 is an exemplary perspective view showing a region of the mask of FIG. 13 enclosed by a dash-dotted line D of FIG. 5.

As shown in FIGS. 13 and 14, for example, a plurality of first engaging claws 94 are provided on the respective inner peripheral surfaces of the left- and right-hand peripheral walls 91 and 92 of the mask 13. As shown in FIGS. 5, 7 and 9, on the other hand, the left- and right-hand peripheral walls 16c and 16d of the cover 12 are provided with second engaging claws 95 corresponding to the first engaging claws 94, individually. When the mask 13 is attached to the cover 12, as shown in FIG. 15, the first and second engaging claws 94 and 95 engage one another. Thus, the mask 13 is removably fixed to the cover 12.

The following is a description of an example of assembly of the portable computer 1.

First, the bracket 25 is fixed to the cover 12. More specifically, the engaging holes 33a, 34a and 35a of the second, third, and fourth fixing portions 33, 34 and 35 are aligned with the engaging protrusions 51, 61 and 71, respectively, of the cover 12, and the mounting position for the bracket 25 is adjusted. After the mounting position for the bracket 25 is adjusted, the first to fourth fixing portions 32 to 35 of the bracket 25 are fixed to the cover 12 by means of the screws 44, 53, 63 and 76, respectively.

After the bracket 25 is fixed to the cover 12, the display device 8 is fixed to the bracket 25. More specifically, the display device 8 is placed on the rear wall 15 of the cover 12, and it is fixed to the bracket 25 with the screws 38. As this is done, the screws 38 are attached sideways with respect to the cover 12 through the notches 39 in the left- and right-hand peripheral walls 16c and 16d. If the display device 8 is fixed to the bracket 25, it is then fixed to the cover 12.

After the display device 8 is fixed to the cover 12, the mask 13 is combined with the cover 12. If the first and second engaging claws 94 and 95 are caused to engage one another, the mask 13 is fixed to the cover 12. Thereupon, the assembly of the display unit 3 is completed.

The following is a description of the function of the portable computer 1.

If the portable computer 1 is dropped on the floor or a desk, for example, the display housing 7 is subjected to an impact by collision. This impact urges the display device 8 to deviate vertically or horizontally in FIG. 4 with respect to the display housing 7. As the display device 8 is thus urged to shift and be displaced, the bracket 25, being springy, is deformed. If the bracket 25 is deformed, an impact load that acts between the display device 8 and the first to fourth fixing portions 32 to 35 fixed to the cover 12 is partially absorbed as the bracket 25 is deformed.

According to the portable computer 1 constructed in this manner, the impact that is transferred to the display device 8 can be eased, so that the impact resistance of the computer 1 is improved.

The first and second fixing portions 32 and 33 of the bracket 25 are fixed individually to the third regions 57 of the cover 12. The third fixing portion 34 is spaced from the display device 8 and fixed to the peripheral wall 16 of the cover 12. The fourth fixing portion 35 is fixed to the inside of the third projection 18c of the cover 12. Thus, neither fixing portions nor screws that fix the bracket 25 to the cover 12 exist just beside the display device 8.

If the portable computer 1 is dropped on the floor or a desk, for example, the display device 8 is urged by an impact load to shifts its position in the display housing 7. If any fixing portion that fixes the bracket 25 to the cover 12 exists just beside the display device 8, the display device 8 cannot be displaced, so that a substantial stress is produced between the display device 8 and the fixing portion.

If neither fixing portions nor screws that fix the bracket 25 to the cover 12 exist just beside the display device 8, as in the case of the portable computer 1 according to the present embodiment, on the other hand, the display device 8 can be displaced in some measure in the display housing 7.

In other words, portions between the fixing portions 32, 33, 34 and 35 that fix the bracket 25 to the cover 12 and the holding portion 31 that fixes the bracket 25 to the display device 8 are deformed to absorb some of the impact load. Thereupon, the impact load is eased as it is transferred to the display device 8. Thus, the possibility of the display device 8 being broken is lowered.

A certain effect can be produced if the fixing portions 32 and 34 of the bracket 25 are fixed to the peripheral wall 16 of the cover 12, for example. The peripheral wall 16 of the cover 12 is one of those regions in the cover 12 which are farthest from the display device 8. Since the bracket 25 is fixed to the peripheral wall 16 of the cover 12, a large region to serve as a damper portion can be secured between the display device 8 and the fixing portions 32 and 34 of the bracket 25.

Further, the peripheral wall 16 of the cover 12 is one of those regions in the display housing 7 which are farthest from the display device 8. If the display device 8 undergoes any lateral deviation, therefore, the possibility of its touching the screws 44 and 63 of the fixing portions 32 and 33 and the like is so small that a great stress can be restrained from acting on the display device 8.

If the fixing portions 33 and 35 of the bracket 25 are fixed to the rear wall 15 of the cover 12, for example, the distances between the display device 8 and the fixing portions 33 and 35 are shorter than in the case where the fixing portions are fixed to the peripheral wall 16. Since the fourth fixing portion 35 is fixed to the third projection 18c of the cover 12, however, a distance can be secured between the fourth fixing portion 35 and the display device 8. However, the region for the fourth fixing portion 35 to be fixed is not limited to the third projection 18c. Since a relatively wide space can be secured for the lower end portion of the cover 12 in which the inverter 19 and the like are contained, for example, the fourth fixing portion 35 can be separated wide enough apart from the display device 8 even if it is fixed to a position beyond the third projection 18c.

The second fixing portion 33 of the bracket 25 is fixed to that part of the rear wall 15 which is situated in one of the third regions 57 of the cover 12. If the display device 8 undergoes a lateral deviation along the depth or vertical direction of the cover 12 as illustrated in FIG. 4 (i.e., in the direction from the lower peripheral wall 16b toward the upper peripheral wall 16a and in its opposite direction), for example, it never touches the screw 53 or the like at the second fixing portion 33, so that no substantial impact load acts between the display device 8 and the second fixing portion 33.

If the display device 8 undergoes a lateral deviation along the width or horizontal direction of the cover 12 as illustrated in FIG. 4 (i.e., in the direction from the left-hand peripheral wall 16c toward the right-hand peripheral wall 16d and in its opposite direction), for example, on the other hand, it never touches the screw 53 or the like at the second fixing portion 33, as in the aforesaid case. Thus, no substantial impact load acts between the display device 8 and the second fixing portion 33.

Thus, if the bracket 25 is fixed to the third regions 57 of the cover 12, a substantial impact load can be restrained from acting on the display device 8 even though the bracket 25 is fixed to the rear wall 15. Fixing the bracket 25 to the third regions 57 of the rear wall 15 is effective in avoiding contact between the display device 8 and the screws or the like at the upper end portion of the display housing 7 that is limited in space.

If the bracket 25 can be fixed to the rear wall 15, that is, if the screw 53 can be fastened extending at right angles to the rear wall 15, the efficiency of screwing operation can be improved. This improvement leads to improvement in assemblability of the portable computer 1.

From another point of view, the bracket 25 according to the present embodiment can take advantage of its spring characteristic to ease an impact that is transferred to the display device 8. Thus, if the display device 8 is urged to deviate, the bracket 25 is deformed as the device 8 is displaced. The deformation of the bracket 25 can absorb some of the impact load that acts on the display device 8.

The bracket 25 combines two functions, a function to fix the display device 8 to the display housing 7 and a function to reinforce the rigidity of the housing 7 by being connected to the hinge shaft 23. Thus, the one bracket 25 is substituted for two conventional brackets that are separately provided corresponding to the two functions. This contributes to improvement in assemblability, miniaturization, and cost reduction of the portable computer 1.

If the thickness of the holding portion 31 of the bracket 25 is smaller than that of the end portion 41 of the bracket 25 that is connected to the hinge shaft 23, the end portion 41 of the bracket 25 can be given necessary torque strength for a hinge bracket. Also, the bracket 25 can benefit from a spring characteristic that enables it to be deformed as the display device 8 is displaced.

If the thickness of the bracket 25 between the first fixing portion 32 and the end portion 41 is greater than that of the holding portion 31, for example, the end portion 41 of the bracket 25 that should be subjected to a high torque can be firmly fixed to the cover 12. If the thickness of the bracket 25 between the first and second fixing portions 32 and 33 is reduced, for example, the bracket 25 has a higher spring characteristic between the first and second fixing portions 32 and 33. Thus, the bracket 25 can effectively absorb the impact load as the display device 8 undergoes a lateral deviation.

The holding portion 31 can be firmly supported by the cover 12 if the first fixing portion 32 of the bracket 25 is situated between the holding portion 31 and the end portion 41 that is connected to the hinge shaft 23 and if the second fixing portion 33 is provided at the other end of the bracket 25. If the first and second fixing portions 32 and 33 are distant from each other, moreover, the resistance against the impact load is enhanced and the accuracy of mounting of the display device 8 is further improved. If the bracket 25 extends at right angles to the axial direction of the hinge shaft 23, the cover 12 can be fully reinforced to withstand a torque that acts on it as the display unit 3 swings around the shaft 23.

If the screws 38 can be attached at right angles to the side faces 8c and 8d of the display device 8, a standard product that has threaded holes in its side faces can be adopted as the display device 8. If the peripheral walls 16c and 16d have the notches 39, the display device 8 can be easily screwed to the bracket 25 that is already attached to the cover 12. If the peripheral walls 91 and 92 of the mask 13 cover the notches 39, the external appearance of the portable computer 1 is improved. According to the portable computer 1, moreover, the peripheral walls 91 and 92 of the mask 13 need not be provided with any threaded holes, so that seals that close the threaded holes, for example, can be omitted.

If the bracket 25 has the third fixing portion 34, the possibility of its being disengaged from the peripheral wall 16 during the swinging motion of the display unit 3 is reduced. If the ribs 81 and 82 are provided so that the damper members 83 are arranged between the display device 8 and the ribs 81 and 82, some of the impact load that acts on the display device 8 is absorbed by the damper members 83. Thus, the impact resistance of the portable computer 1 is improved.

The third fixing portion 34 of the bracket 25 is screwed to the cover 12. Since the bracket 25 has a spring characteristic its threaded hole 34b may possibly be deviated from the hole 62 of the cover 12, for example.

In the portable computer 1 according to the present embodiment, for example, the peripheral wall 16d is provided with the engaging protrusion 61, and the bracket 25 with the engaging hole 34a. According to this arrangement, the bracket 25 can be easily positioned by causing the engaging hole 34a to engage the engaging protrusion 61. Specifically, the threaded hole 34b of the bracket 25 and the hole 62 of the cover 12 can be aligned with each other by fitting the engaging protrusion 61 into the engaging hole 34a. Thus, the assemblability of the portable computer 1 is improved. This effect also applies to the other engaging holes 33a and 35a and engaging protrusions 51 and 74.

Figure 18:
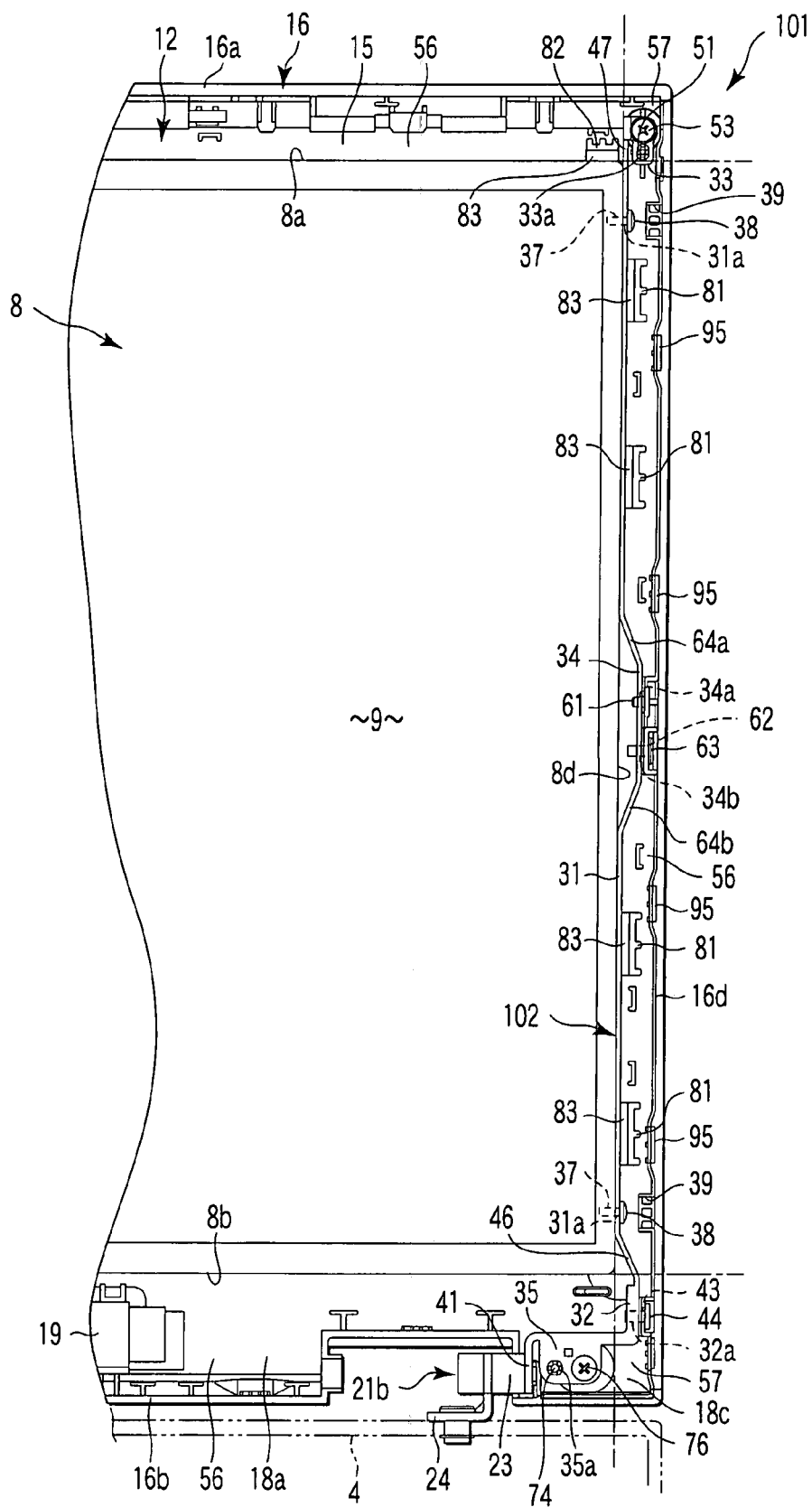
FIG. 18 is an exemplary plan view showing the interior of a display unit according to a second embodiment of the invention.

A portable computer 101 as an electronic apparatus according to a second embodiment of the invention will now be described with reference to FIG. 18. Like numbers are used to designate those configurations which have the same functions as those of the portable computer 1 according to the first embodiment, and a description thereof is omitted.

The portable computer 101 is provided with a bracket 102. As shown in FIG. 18, the bracket 102 includes one integrally molded member that has the same functions as those of the first and second members 71 and 72 of the bracket 25 according to the first embodiment and replaces the first and second members. The same effects of the portable computer 1 according to the first embodiment can be obtained from the portable computer 101 constructed in this manner.

Figure 19:
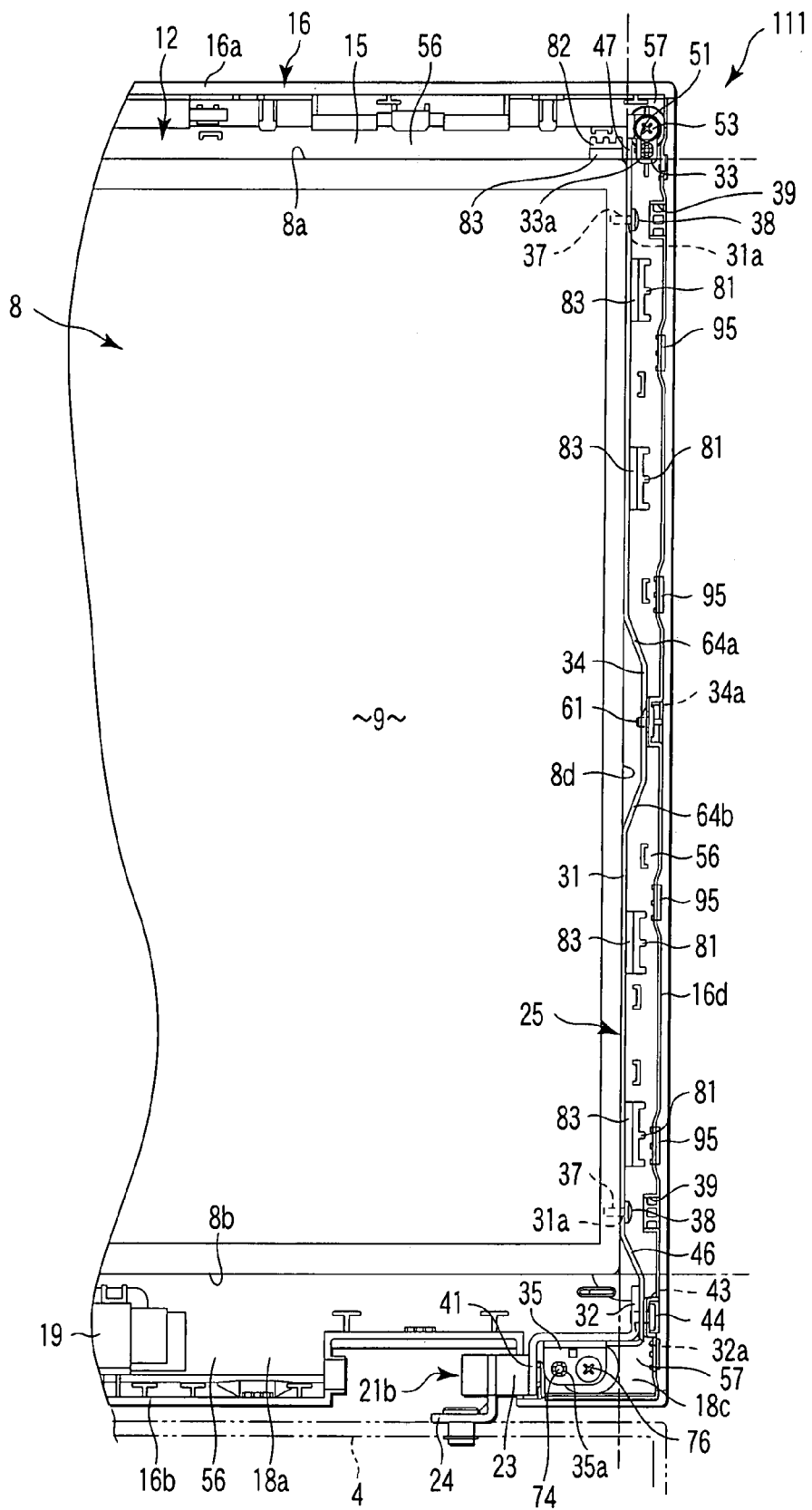
FIG. 19 is an exemplary plan view showing the interior of a display unit according to a third embodiment of the invention.

A portable computer 111 as an electronic apparatus according to a third embodiment of the invention will now be described with reference to FIG. 19. Like numbers are used to designate those configurations which have the same functions as those of the portable computer 1 according to the first embodiment, and a description thereof is omitted.

The portable computer 111 is provided with a third fixing portion 34, which has an engaging hole 34a. An engaging protrusion 61 protrudes from a right-hand peripheral wall 16d of a cover 12. However, the third fixing portion 34 is provided with neither a hole nor a threaded hole and is not screwed at all.

Although screwing the third fixing portion 34 is thus omitted, a bracket 25 is fixed to first, second, and fourth fixing portions 32, 33 and 35. Thus, the same effects of the portable computer 1 according to the first embodiment can be obtained from the portable computer 111 constructed in this manner. If the engaging hole 34a of the third fixing portion 34 of the bracket 25 engages the engaging protrusion 61 of the cover 12, moreover, the bracket 25 is fixed at right angles to the direction of projection of the engaging protrusion 61. Specifically, the bracket 25 is prevented by the combination of the engaging hole 34a and the engaging protrusion 61 from being easily disengaged from the cover 12.

According to the portable computer 111, the bracket 25 is fixed to the cover 12 by the first and second fixing portions 32 and 33 in third regions 57 and the fourth fixing portion 35 in a third projection 18c. Thus, if a display device 8 undergoes a lateral deviation in the horizontal direction as illustrated, there is no possibility of its touching any screw of the third fixing portion 34, so that the impact resistance is further improved. The bracket 102 according to the second embodiment may be used in place of the bracket 25 in the portable computer 111.

Although the portable computers 1, 101 and 111 according to the first, second and third embodiments have been described herein, the present invention is not limited to these embodiments. For example, the thickness of the bracket 25 may be uniform only if the bracket 25 is formed having necessary torque strength and spring characteristic. If a satisfactory impact resistance can be secured by the spring characteristic of the bracket 25 only, the ribs 81 and 82 and the damper members 83 may be omitted. The third fixing portion 34 may be omitted if the bracket 25 is securely fixed to the cover 12 by the first and second fixing portions 32 and 33. The screws for fixing the display device 8 need not always be attached sideways with respect to the cover 12. Electronic apparatuses to which the present invention is applicable are not limited to portable computers.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An electronic apparatus comprising:
a first case including a peripheral wall;
a display device contained in the first case and including four side faces;
a second case;
a hinge shaft which swingably supports the first case on the second case; and
a bracket which is coupled to the hinge shaft and extends in the first case, the bracket including (i) a holding portion, which extends along one of the side faces of the display device and is fixed to the display device, (ii) a first fixing portion fixed to a peripheral portion of the first case situated off regions defined between at least one side face of the display device and the peripheral wall, and (iii) a second fixing portion provided on the holding portion, spaced from the display device, and coupled to the peripheral wall of the first case.

2. An electronic apparatus according to claim 1, wherein the bracket includes an end portion coupled to the hinge shaft, and the thickness of the holding portion of the bracket is smaller than the thickness of the end portion.

3. An electronic apparatus according to claim 1, wherein the bracket includes an end portion coupled to the hinge shaft and at least a third fixing portion, the first fixing portion being provided between the holding portion and the end portion, the third fixing portion being provided at an end portion of the bracket opposite from the end portion coupled to the hinge shaft.

4. An electronic apparatus according to claim 3, wherein the thickness of a part of the bracket which is situated between the first and third fixing portions is smaller than the thickness of a part of the bracket situated between the first fixing portion and the end portion coupled to the hinge shaft.

5. An electronic apparatus according to claim 1, which further comprises a screw that fixes the bracket to the display device, the screw engaging the display device along a direction perpendicular to the side face of the display device along which the bracket extends.

6. An electronic apparatus according to claim 5, wherein the bracket includes a hole into which the screw is inserted, and the peripheral wall of the first case includes a notch in a region opposite the hole of the bracket.

7. An electronic apparatus according to claim 6, wherein the first case includes a cover, which includes a rear wall situated behind the display device and the peripheral wall, and a mask combined with the cover, the mask including another peripheral wall which externally faces the peripheral wall of the cover and covers the notch.

8. An electronic apparatus according to claim 1, which further comprises a rib, which is formed between the peripheral wall of the first case and one of the side faces of the display device, and a damper member interposed between the rib and the side face of the display device.

9. An electronic apparatus according to claim 1, wherein the second fixing portion extends along the peripheral wall of the first case.

10. An electronic apparatus according to claim 1, wherein the peripheral wall of the first case includes a protrusion which protrudes inward from the first case, and the second fixing portion of the bracket includes a hole which engages the protrusion.

11. An electronic apparatus according to claim 1, wherein the bracket has a spring characteristic.

12. An electronic apparatus comprising:
a first case including a peripheral wall;
a display device contained in the first case and including four side faces;
a second case;
a hinge shaft which swingably supports the first case on the second case; and
a bracket which extends in the first case, the bracket including (i) an end portion coupled to the hinge shaft, (ii) a holding portion, which extends along one of the side faces of the display device and is fixed to the display device, the thickness of the holding portion being smaller than the thickness of the end portion, (iii) a first fixing portion placed between at least one side face of the display device and the peripheral wall, and (iv) a damper portion coupled to the holding portion and the first fixing portion.

13. An electronic apparatus according to claim 12, wherein the bracket includes a second fixing portion, the first and second fixing portions fixed to the first case, the first fixing portion being provided between the holding portion and the end portion, the second fixing portion being provided at an end portion of the bracket opposite from the end portion coupled to the hinge shaft.

14. An electronic apparatus according to claim 13, wherein the thickness of a part of the bracket which is situated between the first and second fixing portions is smaller than the thickness of a part of the bracket situated between the first fixing portion and the end portion coupled to the hinge shaft.

15. An electronic apparatus according to claim 12, wherein the bracket includes a third fixing portion which is provided on the holding portion, is spaced from the display device, extends along the peripheral wall of the first case, and is fixed to the peripheral wall.

16. An electronic apparatus comprising:
a display device including a display screen and four side faces;
a first case including a cover, which includes a rear wall situated behind the display device and a peripheral wall which rises from a peripheral edge portion of the rear wall and surrounds the four side faces of the display device, and a mask which is combined with the cover and faces the display screen of the display device;
a second case; and
a hinge mechanism which swingably connects the first case to the second case, wherein
the cover including a first region opposite a rear surface of the display device, second regions defined between at least one of the side faces of the display device and the peripheral wall, and third regions off the first and second regions,
the hinge mechanism including a bracket which extends in the first case, the bracket including (i) a holding portion, which extends along one of the side faces of the display device and is fixed to the display device, (ii) a first fixing portion fixed to one of the third regions of the cover, and (iii) a damper portion coupled to the holding portion and the first fixing portion.

17. An electronic apparatus according to claim 16, which further comprises a screw that fixes the bracket to the display device, and wherein the bracket includes a hole into which the screw is inserted, the peripheral wall of the first case includes a notch in a region opposite the hole of the bracket, and the screw is attached to the display device through the notch along a direction perpendicular to the side face of the display device along which the bracket extends.

18. An electronic apparatus according to claim 17, wherein the mask includes another peripheral wall which externally faces the peripheral wall of the cover and covers the notch.

19. An electronic apparatus according to claim 1, wherein at least a first damper portion is coupled to the holding portion and to one end of the second fixing portion.

* * * * *